United States Patent [19]
Hatchett et al.

[11] 4,185,314
[45] Jan. 22, 1980

[54] RECORD DISK CARTRIDGE HAVING EJECT SPRING WITHIN CARTRIDGE

[75] Inventors: Michael R. Hatchett; Leonard J. Rigbey, both of Tucson, Ariz.

[73] Assignee: International Business Machines Corporation, Armonk, N.Y.

[21] Appl. No.: 956,811

[22] Filed: Nov. 2, 1978

Related U.S. Application Data

[63] Continuation-in-part of Ser. No. 846,228, Dec. 26, 1978, Pat. No. 4,131,199.

[51] Int. Cl.² .................. G11B 23/04; G11B 5/016; B65D 85/02
[52] U.S. Cl. .................. 360/133; 206/444; 206/333
[58] Field of Search ............ 360/133, 99, 97–98, 360/135; 206/444, 309, 312, 303

[56] References Cited

U.S. PATENT DOCUMENTS

| 3,416,150 | 12/1968 | Lindberg, Jr. | 206/444 |
| 3,529,301 | 9/1970 | Hiruta | 360/133 |
| 3,593,327 | 7/1971 | Shill | 360/133 |
| 4,084,200 | 4/1978 | Adair et al. | 360/133 |

Primary Examiner—Alfred H. Eddleman
Attorney, Agent, or Firm—Herbert F. Somermeyer

[57] ABSTRACT

A record disc cartridge has a single internal shutter for opening and closing a head access port adjacent a spindle access member in one wall. A further aperture allows the shutter to be actuated to an open position as the cartridge is moved into a playing position. A spring in the cartridge yieldably biases the shutter to a closed position. When the shutter is open, the spring in the cartridge is cocked to eject the cartridge from a player. Upon release, the spring acts to eject the cartridge.

8 Claims, 4 Drawing Figures

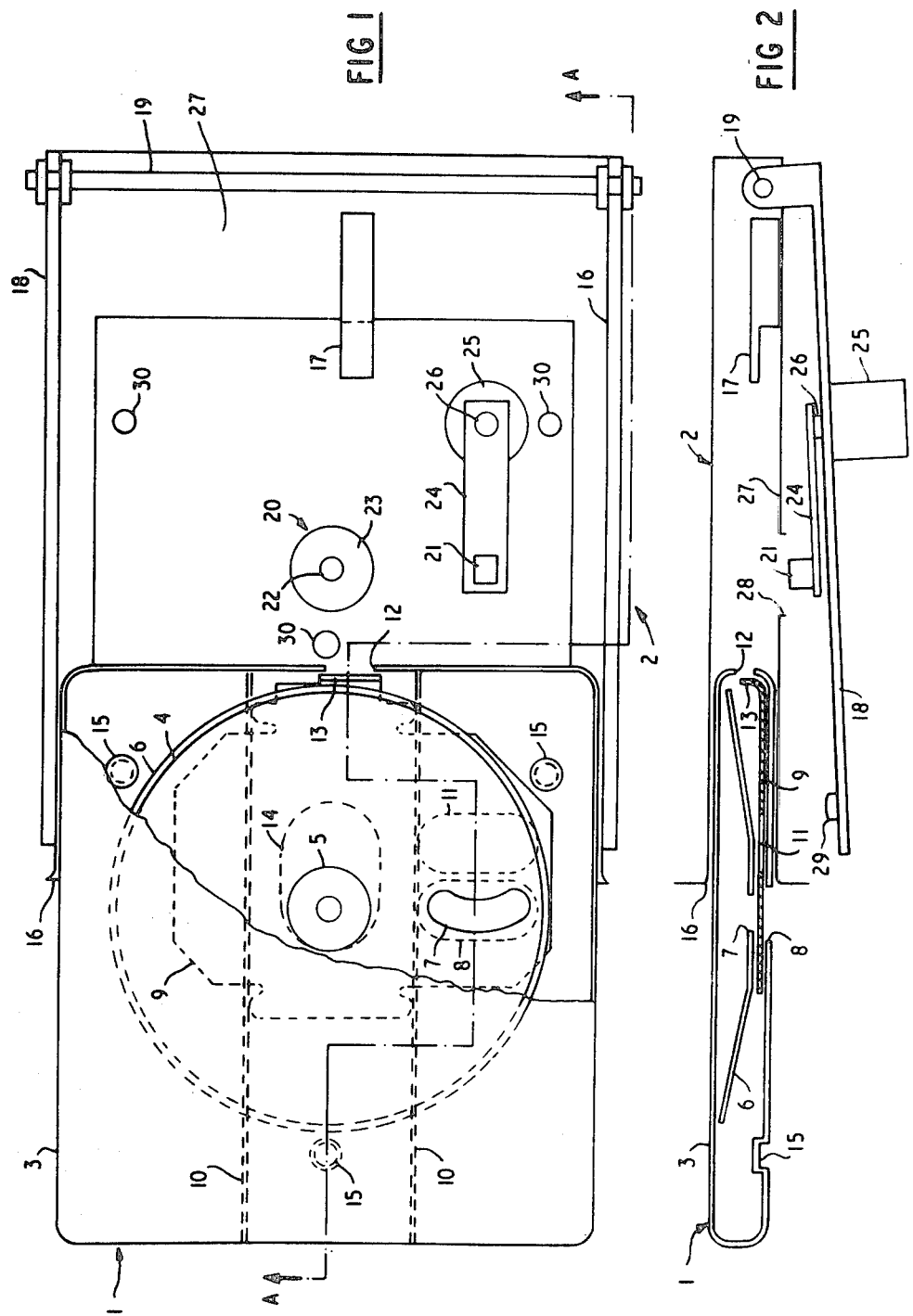

RECORD DISK CARTRIDGE HAVING EJECT SPRING WITHIN CARTRIDGE

DOCUMENTS INCORPORATED BY REFERENCE

This application is a continuation-in-part of application Serial No. 846,228, Dec. 26, 1978; now U.S. Pat. No. 4,131,199.

Copending, commonly assigned patent application Ser. No. 847,376 filed Oct. 31, 1977, a continuation of Ser. No. 775,233 filed Mar. 7, 1977, now abandoned, shows a back plate and cartridge assembly related to the present invention.

BACKGROUND OF THE INVENTION

The invention relates to record medium cartridges adapted to be installed for recording operations on a record player unit. In a best mode, the cartridge contains a record storage disk.

Random access disk stores have been used in data processing systems. Such disk stores employ a disk assembly of one or more rigid magnetically coated disks which can be mounted on a disk drive unit for recording and playback of data from the disk surfaces. Often the disks are contained within a cartridge or pack to facilitate handling and storage as well as to protect the surfaces of the disks during installation and removal from the disk drive. The cartridge prevents human contact with the disk surfaces and seals the disk assembly from airborne contaminants. Provision is made to allow the necessary connections to be made with the drive unit, including the introduction of one or more transducers into a transducing proximity to the disk surfaces and the attachment of the disk assembly to a drive shaft for rotation of the disks. Similar arrangements apply to tape containing cartridges.

One such disk cartridge containing a rigid disk has been provided with an access door in its side which is automatically opened when the cartridge is installed on the drive unit to permit transducers contained within the drive unit to be inserted until they lie above the disk surfaces, respectively, When the disks are up to operational speed, the transducers are loaded toward the disk surfaces until a suitable air bearing is established. Transducing operations then are performed over the disk surfaces in the usual way under control of a transducer actuator mechanism.

As track and bit densities increased and transducer flying heights became correspondingly smaller, it became increasingly important to ensure that the disk surfaces over which the transducers fly on their air bearings are free of contaminating particles which could lead to transducer crashes. The movement in the industry therefore was away from cartridges such as described above and more toward factory sealed data modules containing disks, transducers and either all or part of the transducer actuator mechanism. These modules were provided with a mechanical interface for rotating the enclosed disks and, where necessary, for connecting the remainder of the actuator, and an electrical interface for controlling the transducing operations on the disks within the module.

At the same time, development of disk-shaped flexible record substrate material was taking place. An advantage of using flexible disks is that, the disk flies over the head in contrast to the reverse as in the case with rigid disks. Accordingly, a noncompliant head mounting can be used and the expensive suspension unit previously required can be dispensed with. Furthermore, flexible disks seem to be less affected by contamination than their rigid counterparts. This it is felt is due to the relatively low mass of the flexible material and its low inertia which enables it to lift over contaminants without causing damage to either transducer or disk surface. This has been found to be the case even for an average disk head operation as low as 10 microinches.

With the availability of thin flexible material, the development of a flexible disk cartridge was undertaken for installation during use of a drive unit containing the disk drive motor and the head actuator mechanism. Apertures are required in the cartridge to permit insertion of the head for accessing the surface of the disk and for connection of the disk to the drive motor. Although problems of contamination are not so great as with rigid disks, the considerable reduction of disk-to-head separation during operation makes it desirable to keep the disk enclosure as free of contaminants as possible. Thus apertures through the enclosure which expose the disk should be closed when the cartridge is not in use on the drive. This closure prevents damage to the disk causes by operator contact during handling and ingress of at least gross contaminants durng such handling, as well as during storage periods.

Cartridge ejection mechanisms have been in the drive unit. These ejection mechanisms have included over-the-center springs and other forms of two-stage spring-type mechanisms. Removal of such mechanisms, particularly in a low cost drive, would simplify as well as reduce the cost of the drive.

SUMMARY OF THE INVENTION

According to the invention, a record containing cartridge intended for use installed on a record playing drive unit, comprises an enclosure, a flexible record assembly supported within the enclosure for movement therein, a first aperture through the enclosure to permit insertion therethrough of a record/playback head included in such a drive unit in a direction substantially parallel to said axis, a second aperture through the enclosure through which the record assembly may be engaged for motion, a shutter mechanism within the enclosure movable from a first position for opening the first aperture, biasing means biasing the shutter mechanism toward said first position, and a second aperture through the enclosure through which prior to use said shutter mechanism is engaged and moved against the action of said biasing means to said second position. The biasing means stores energy when the shutter is open. Upon release, the biasing means acts as an ejector in the cartridge which pushes against a stop in the player to eject the cartridge. With the shutter biasing means also doing cartridge ejection keeps cartridge cost low while providing the ejection function. The term "motion" means rotation for a disk type record member and longitudinal movement for a tape or cord type of record member.

The foregoing and other objects, features, and advantages of the invention will be apparent from the following more particular description of preferred embodiments of the invention, as illustrated in the accompanying drawings.

THE DRAWINGS

FIG. 1 shows a part cut-away plan view of a disk cartridge according to the present invention in the process of being loaded or installed on a disk drive unit.

FIG. 2 shows a part-sectional view taken along the line A—A in FIG. 1.

DETAILED DESCRIPTION

Figure 3:
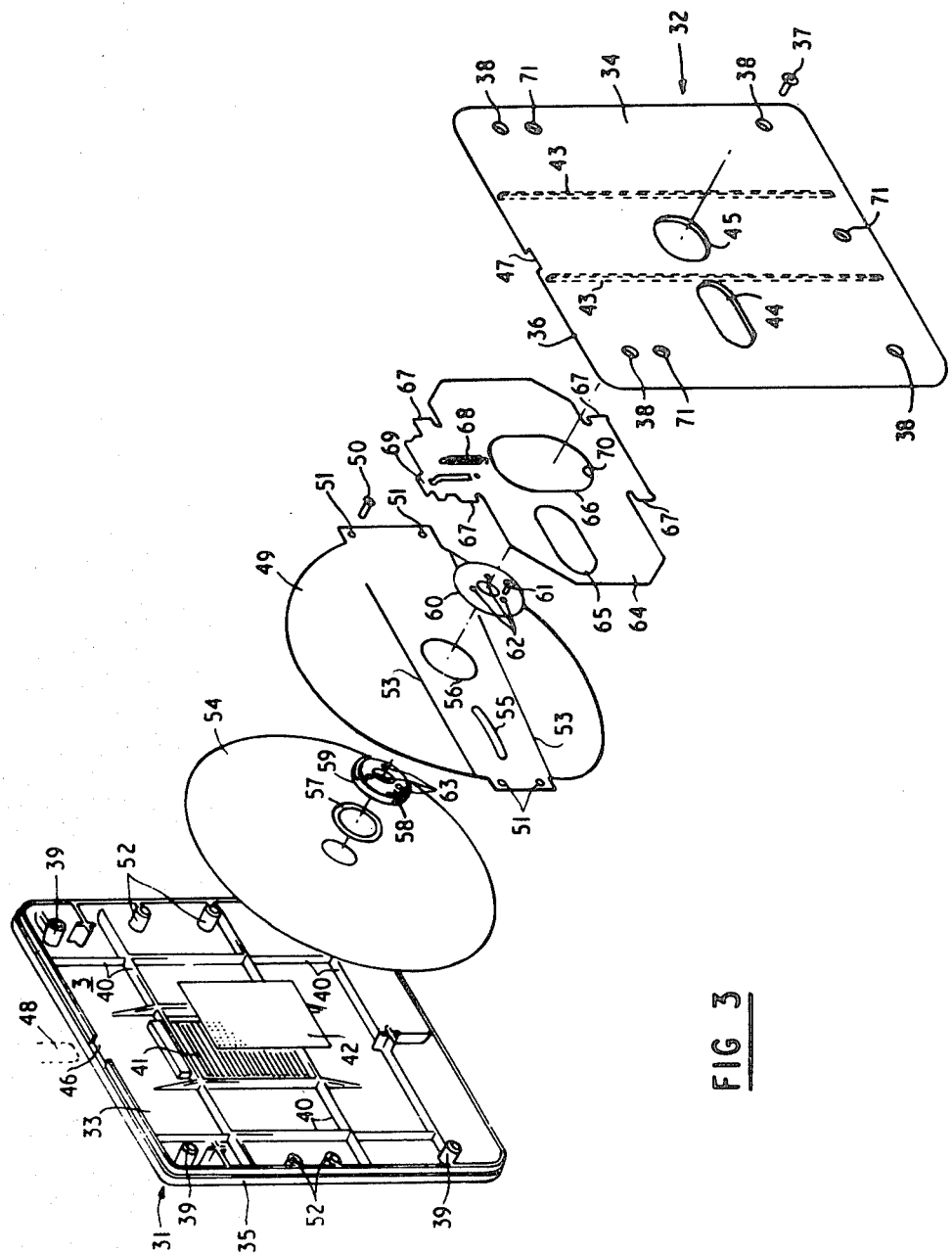
FIG. 3 is an exploded perspective view of the disk cartridge of FIGS. 1 and 2.

Cartridge 1, which will be described in more detail later, consists of a slim rectangular disk enclosure 3 containing a flexible record disk 4 (omitted from FIG. 2). Disk 4 has a central metal hub 5 for attachment to a drive motor in the drive unit by means of a magnetic chuck. Disk 4 is contained within enclosure 3 above circular backing plate 6 which stabilizes the rotating disk during use. The backing plate 6 in this embodiment is shaped by being bent along two chords (not shown in FIG. 1) to present a generally concave flying surface to flexible disk A. An elongated slot 7 disposed radially with respect to the overlying disk through the backing plate 6 and a corresponding, though somewhat larger, slot 8 through one major face of the disk enclosure 3 permit insertion of a record and/or playback head into enclosure 3 for transducing operations on the surface of flexible disk 4 facing backing plate 6.

Further aligned holes (FIG. 3) are provided centrally disposed through the backing plate and disk enclosure respectively to permit attachment of the disk hub 5 to drive motor (not shown) for rotation of the disk 4. The construction of the disk hub 5 is such that it is supported for rotation and retained within the hole in the backing plate. In view of this complication, these holes are not shown in FIG. 1 or 2 but are shown in the more detailed FIG. 3 which will be referred to later.

A full description of the backing plate 6 is to be found in copending, commonly assigned application for Letters Patent, supra. Although it is believed that such a backing plate produces better disk flying characteristics than do plates presenting different flying surfaces to the underlying disk, it should be clearly understood that it is not intended that the scope of the present invention should be limited in any way by the inclusion of this particular plate in the disk enclosure.

A slidable shutter 9 closes head slot 8 in disk enclosure 3 when the cartridge is not installed on a drive unit. The shutter 9 is supported by two rails 10 formed on the inside of the enclosure 3 and is provided with a head aperture 11 corresponding in shape and size to the head aperture 8 in the enclosure. Shutter 9 is spring loaded so that normally it is held in the position shown closing head aperture 8. A small shutter actuator access hole 12 in the leading edge of the cartridge 3 permits insertion of a pin 17 therethrough to engage upstanding lip 13 of shutter 9 to slide it along rails 10 to its open position in which the aperture 11 registers with head aperture 8. The actuator access hole 12 is off-centered so that the cartridge can only be installed on a drive when properly oriented.

The shutter 9 also has an aperture 14 through which the hub 5 of the disk may be engaged. Since the hub is retained in a hole 7 of backing plate 6, there is little space through which contaminants can enter enclosure 3. In this embodiment of the invention, shutter 9 does not not close the hub aperture through the enclosure but is sufficiently elongated to permit shutter movement between the closed and the open positions with the hub 5 exposed at all times. When in the open position, shutter 9 clearly must not impede rotation of the hub, however, it has been found useful to arrange for the left hand edge of the aperture 14 (as viewed in FIG. 1) to abut the disk hub 5 when the shutter is in its closed position in order to restrain the hub from moving within the supporting aperture in the backing plate. Although only slight movement is possible with an unrestrained hub, vibrations could be induced which could lead to damage to the delicate disk surface by abrasion. Finally, three circular recess indentations 15 in the lower surface of the cartridge 1 cooperate with corresponding detent pins 29 in the drive 2 to positively locate the cartridge on the drive during use.

The disk drive 2 for receiving cartridges of the nature described above is provided with a front loading slot 16 into which a cartridge is inserted. A finger or pin 17 is located at the back of the slot in a position such that during the final stages of a cartridge loading operation it enters the shutter actuator hole 12 in the cartridge, contacts the shutter lip 13 and, as the cartridge is pushed into playing position, slides the shutter 9 to simultaneously open the head aperture 8 and to release the hub 5 for subsequent rotation of the drive.

A plate 18 is pivotally supported by pivot pin 19 to be movable toward and away from the slot 8 in order to bring a disk drive hub assembly 20 and record/playback head 21 into operating engagement with a disk cartridge installed on the drive unit. The drive hub assembly 20 (shown in FIG. 1 only) consists of a central spindle 22 rotatable by a drive motor (not shown) and a magnetic chuck 23. The head 21 is carried by an actuator mechanism of the type having a pivoted support arm 23 carrying the head at its free end and driven by a voice coil motor 25 operating directly on the arm spindle 26. Since that portion of the drive is not pertinent to the present invention, it is not further described.

After a cartridge 1 has been inserted into the slot 16 of the drive unit 2, the plate 18 is moved to, and retained in, its upper position by a latch mechanism not shown in the drawings. In this position, the hub assembly 20 protrudes through a hole (not shown) in the base 27 of loading slot 16 into the cartridge and engages and supports for rotation the disk hub assembly 5. The head 21 also enters the cartridge by means of a slot 28 (shown only in FIG. 2) in the base 27 of the cartridge loading slot 16 and the now open head aperture 8. The actuator mechanism is constructed so that the head 21 protrudes beyond the backing plate 6 and into the plane of rotation of the disk 4. During operation, air bearings are generated between the disk and the backing plate and between the disk and the head. More details of the disk flying characteristics are to be found in our aforesaid copending, commonly assigned application. Finally, detent pins 29 (only one shown) carried by plate 18 respectively extend through holes 30 in the base 27 and into the locating recesses 15 in the underside of the cartridge 1. The cartridge is thus retained accurately located on the drive unit until the plate 18 is retracted at the end of an operation.

FIG. 3 shows a detailed exploded view of the cartridge shown in FIGS. 1 and 2. The disk enclosure is provided by rectangular cover 31 shaped to form a pressfit with a corresponding rectangular base 32. The cover and base consist essentially of rectangular web portions 33 and 34 which form the major faces of the cartridge 1 surrounded by stepped peripheral walls 35 and 36 which form the sides. A stepped inner flange of wall 35 forms an air-tight fit with complementary outer flange of wall 36. The base 32 and cover 31 are pressed together and held by screws 37 (only one shown) through holes 38 in the base received in threaded bosses 39 on the inside of cover 31.

The rectangular web portion 33 of the cover is strengthened by longitudinal orthogonal ribs 40 distributed over its inner surface. Ventilation slots 41 are provided in the cover through a central rectangular area defined by the ribs 40. A filter 42 covers the slots to prevent ingress of contaminants to the disk enclosure. Similar strenghtening ribs are provided on the inside of the base 32 but only two which provide the guide rails 43 for the catridge shutter are shown in FIG. 3. The base 32 has an elongated head aperture 44 and a central hub aperture 45. Cutaway portions 46 and 47 respectively in the walls of cover 31 and base 32, produce an offset slot through which a pin 48 (shown dotted) forming part of the drive is inserted during loading to operate the shutter mechanism as described above.

A disk packing plate 49 as described in said copending, commonly assigned application is attached to the inside of cover 31 by means of screws 50 (only one shown) which pass through holes 51 in the plate 49 and are received in threaded bosses 52 on the inside of cover 31. As stated previously, the backing plate 49 is bent along two chords 53 to provide a concave flying surface for a flexible record disk 54 which is movably contained between it and the inside surface of the cover 31. A head aperture 55 and a hub aperture 56 are provided through the backing plate 49.

The flexible disk 54 is supported by a hub assembly to which it is attached by a ring or collet of adhesive 57. The hub assembly is formed from two parts, an annular ring 58 of suitable plastic material with a peripheral flange 59 and a metal hub plate 60. The annular ring 58 passes through the hub aperture 56 in the backing plate 49 and is retained therein by the hub plate 60 which is attached thereto by means of screws 61 (only one shown) passing through holes 62 in the plate 60 and into threaded holes 63 in annular ring 58. The dimensions of these components are such that the hub assembly is supported through the aperture 56 in the backing plate 49 with sufficient clearance to permit unimpeded rotation of the hub assembly 58, 59.

An aperture shutter 63 has a head aperture 65 and a hub aperature 66. Downwardly bent lugs 67 are located between the guide rails 43 on the inside of the base 32. The inside edges of the rails 43 are cut away to accommodate and retain the lugs 67 thus enabling the shutter 64 to be slid up and down between the rails 43. A tension spring 68 attached at one end of the shutter 64 and at the other end of the inside edge of the cartridge retains the shutter at one end of the rails for closing the head aperture 44 in the cartridge. As previously explained, the shutter 64 is automatically slid to its open position with head apertures 44 and 45 in registration during the loading operation by a pin 48 in the drive unit entering the cartridge and engaging raised lip 69 on the shutter. The hub aperture 66 of shutter 64 is sufficiently elongated to give clearance to the hub assembly 58, 59 at all times except when in the fully closed position when the edge 70 engages the hub assembly 58, 59 and restrains it against vibrational or other movement within the backing plate aperture 56. Finally, indentations or recesses 71 are provided in the base 32 of the cartridge to cooperate with detent pins 29 in the drive unit to hold the cartridge accurately located on the drive during operation.

Figure 4:
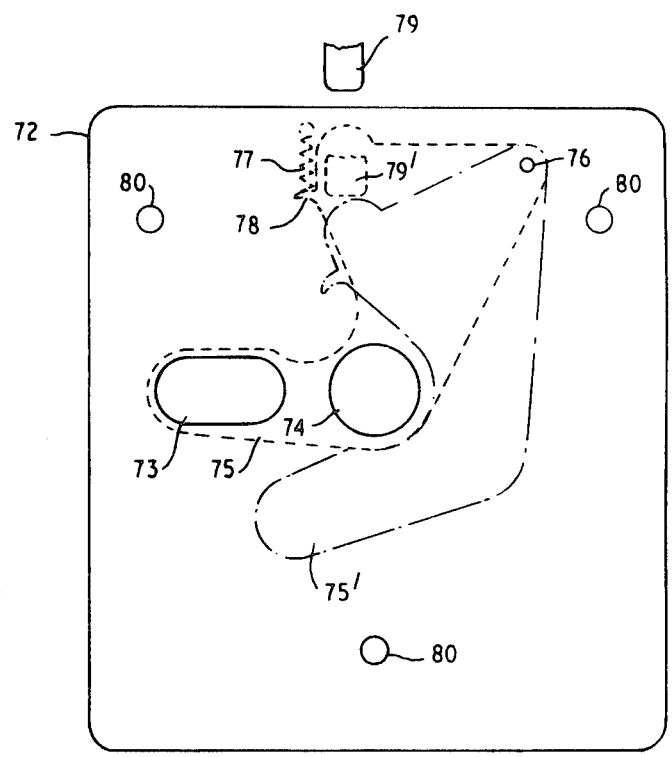
FIG. 4 shows another arrangement of a shutter mechanism for the cartridge shown in FIG. 3.

FIG. 4 shows another shutter mechanism to that so far described which operates with a pivoting action to close both head and hub apertures of a cartridge when it is not in use as a drive. The figure shows a simplified plan view of the base 72 of a cartridge provided with a head aperture 73 and a hub aperture 74. A shutter 75 is shown in dashed outline in its retracted or closed position pivotally mounted on pivot pin 76. A tension spring 77 connected between a lug 78 on the shutter and a point on the inside edge of the cartridge normally holds the shutter in the retracted position closing both apertures 73 and 74. A raised lip (not shown) is provided on the shutter 75 to abut the hub assembly 58, 59 when in the retracted or closed position to prevent unwanted hub movement when the cartridge is not in use on a drive.

The shutter 75 is moved to its open position (shown chain dotted in 75') as before by a pin 79 forming part of the drive unit. The pin is shown dotted in 79' inside the cartridge holding the shutter in its open position 75' against the action of spring 77. The shape of the shutter is such that both apertures 73 and 74 in the cartridge are completely unobstructed by the shutter 75 when in its open position 75'. Indentations or recesses 80 are provided for cartridge location as previously described.

Various modifications to the apparatus described will be apparent to one skilled in the art without departing from the invention. For example, although the described installation of a cartridge on a drive unit involves moving that portion of the drive unit including the actuator mechanism and disk drive hub toward the inserted cartridge, clearly these components could be fixed and the cartridge moved toward them instead. Further, although the cartridge shutter mechanism is automatically opened by a fixed pin as the cartridge is pushed into the loading slot, various other arrangements for opening the head aperture before a head is inserted are possible. For example, it will be apparent that an arrangement is possible in which the cartridge is fully pushed home into the loading slot leaving the head aperture closed to be opened later by a pin activated in response, for example, to movement of the actuator mechanism and hub toward the cartridge. The shutter mechanism can be magnetically actuated as well, provided of course suitable precautions are taken to prevent erasure of disk recordings.

The record disk may be formed from an medium on which data may be recorded by a suitable transducing system with relative movement between the medium and the transducing system. The invention also applies equally to tape-containing cartridges. For example, the biasing means can be identical to the illustrated means, no limitation thereto intended, while the shutter member 9 may have a depending/upstanding flange to selectively cover a transduced access opening on a side wall of a tape cartridge for enabling a transducer to reach the tape contained therein. The term "reciprocally movable" not only includes rectilinear reciprocation of a shutter but also pivoting or rotational reciprocation.

While the invention has been particularly shown and described with reference to preferred embodiments thereof, it will be understood by those skilled in the art that various changes in form and details may be made therein without departing from the spirit and scope of the invention.

What is claimed is:

1. A record medium cartridge movably containing a record medium and including an aperture facing said movably contained record medium for enabling transducing access to said movably contained record medium via said aperture, including in combination:

a shutter member movably mounted interior to said record medium cartridge and adapted for reciprocal motions for covering and uncovering said aperture;

spring means interposed between said shutter member and said record medium cartridge for yieldably urging said shutter member for closing said aperture;

said record medium cartridge having a second aperture; and an operating surface on said shutter member aligned with said second aperture whereby a pin entering said second aperture moves the shutter member against the yieldable urging of said spring means for opening the cartridge and cocking the spring means for ejecting the cartridge by bearing against said entered pin.

2. The record medium cartridge set forth in claim 1 wherein said record medium is a disk shaped member mounted for rotation within said record medium cartridge;

said cartridge having spaced-apart faceplates with a peripheral wall joining said faceplates, said first mentioned aperture being in one of said faceplates whereby said disk record member can rotate thereunder; and said second aperture being in said peripheral wall.

3. The record medium cartridge set forth in claim 2 wherein said shutter moves rectilinearly.

4. The record medium cartridge set forth in claim 2 wherein said shutter member reciprocates in a pivoting manner.

5. The record medium cartridge set forth in claim 1 wherein said cartridge has a pair of spaced-apart faceplates with a peripheral wall joining said faceplates; and said second aperture being in said peripheral wall whereby said spring means operating on said shutter for reciprocal motions toward and away from said second aperture whereby any pin received through said second aperture bears against said shutter member and such that said spring having sufficient energy stored therein when the shutter is open for ejecting the cartridge from a record player when released therefrom.

6. A record medium cartridge, including in combination:

a plate like enclosure having spaced apart faceplates and a peripheral wall joining said faceplates;

a record member having a signal receiving surface and being disposed inside said enclosure;

said peripheral wall having an aperture for receiving a pin from outside said enclosure;

a movable member inside said enclosure and being disposed for reciprocal motions toward and away from said peripheral wall aperture; and spring means inside said enclosure interposed between said enclosure and said movable member for yieldably urging said movable member toward said aperture whereby when said movable member is in a reciprocated position remote from said aperture, said spring is cocked for ejecting said record member cartridge by urging said movable member against a received pin.

7. The record medium cartridge set forth in claim 6 further including:

means in said cartridge for supporting said record member such that said record member is movable in said cartridge;

said enclosure having an access aperture facing said signal receiving surface for enabling transducing access to said signal receiving surface; and said movable member having a shutter portion for covering said access aperture whenever said movable member is adjacent the first mentioned aperture.

8. A record member cartridge, including in combination:

a record member with a signal receiving portion;

an enclosure surrounding said record member and having an access aperture facing said signal receiving portion;

movable means for selectively covering said access aperture;

means yieldably urging said movable means to cover said access aperture capable of storing sufficient energy to move said record member cartridge; and means in said movable means for receiving a cartridge ejection cocking force for storing ejection energy in said yieldably urging means and simultaneously uncovering said access aperture.

* * * * *